Sept. 20, 1938.                C. G. GARRARD                2,130,341
                    METAL CUTTING AND LIKE MACHINE TOOLS
                        Filed Oct. 16, 1935          6 Sheets-Sheet 1

Sept. 20, 1938. C. G. GARRARD 2,130,341
METAL CUTTING AND LIKE MACHINE TOOLS
Filed Oct. 16, 1935 6 Sheets-Sheet 6

INVENTOR
C. Garrard

Patented Sept. 20, 1938

2,130,341

UNITED STATES PATENT OFFICE 2,130,341

METAL CUTTING AND LIKE MACHINE TOOLS

Charles George Garrard, Shenfield, England

Application October 16, 1935, Serial No. 45,303
In Great Britain October 22, 1934

11 Claims. (Cl. 29—37)

This invention relates to automatic and other machine tools and has for its primary object to provide such devices for the production, in bulk, of bright or machined parts, of round, square, hexagonal, octagonal or other section, for example bolts and nuts.

It has for a further object to provide automatic and other machine tools in which such bright or machined parts can readily be produced from ordinary hot rolled round bar, and not necessarily from bright drawn bar as is customary, and as the cost of bright drawn bar is about 40% greater than the hot rolled round bar, a great saving in the cost of material is effected.

Automatic and other machine tools at present employed in the manufacture of machined parts, such for example as nuts and bolts, cannot satisfactorily be used to operate upon the cheaper form of material, chiefly by reason of the fact that ordinary hot rolled round bar varies in size and is not sufficiently straight to be used through a rotating headstock and gripped by the usual spring chuck arrangement.

In general, an automatic or other machine tool constructed according to the invention comprises a suitably supported carrier for the bars, wherein the bars, which are not rotated, are held whilst being operated upon, means for imparting a cutting feed to the carrier or bars if required, means for moving or indexing the carrier, and means for gripping, releasing and feeding the bars through the carrier at required times. It further comprises a suitably supported tool portion, having one or more tool positions arranged to co-operate with the bars when indexed and fed by the bar carrier. The tools are suitably mounted and driven and are all adapted simultaneously to operate upon the bars in the co-operating positions. The tools may all be driven at the same speed or at different speeds to suit the particular operation being carried out by the particular tool and in some cases the speed may be made to vary during the operation in order to give the best results.

Centering, drilling, boring, recessing and similar tools may be employed as well as parting-off or other tools, for operating on the interior or exterior of the bar.

The cutting feed of the tool may be due to the relative movement of the bar or means may be provided for imparting a cutting feed to the tool.

Where tool movements are required other than axial with respect to the bar, such for instance as radial movements, or movements at an angle to the radial, means are provided for effecting these movements of the tool.

In some cases a tool or tools may be mounted to rotate about an axis other than the axis of the bar and whilst being rotated on this axis have a planetary movement around the bar. Such a construction is utilized for the formation of any required number of flats on the exterior of the bar and by suitably proportioning the epicyclic or other gearing, for effecting the drive and the planetary movement of the tool or tools, and determining the position, cutting diameter and number of cutters for each tool, the bar may be given a triangular, square, hexagonal, octagonal or other section having one or more flats for example two parallel flats.

The flats are formed on the bar owing to the fact that the cutting operations of the actual tools or cutters travel through cycloidal paths, which may be actual straight lines or concave or convex curves. The cutters and the bar are so relatively arranged that the cutters operate on the bar at what may be termed the central portions of the cycloidal paths. When these paths have a curved formation the curves may only be what can be termed flat curves, and therefore the central portions thereof are substantially straight lines and the flats formed on the bar are for all practical purposes plane surfaces.

The number of bars carried may be in excess of the tool positions if desired. As the bars after each operation are indexed on, by one or more steps, to the next succeeding tool positions for the next operations, it follows therefore if the number of bars is in excess of the tool positions that at any given position of the carrier, some bars are not operated upon.

In order that the invention may be better understood, it will now be described with reference to the accompanying drawings in which:—

As will be realized, many forms of carrier or magazine for the bars may be employed, but according to a preferred construction and as shown in the drawings, the carrier 24 is of the revolver type and turns about a suitable axis preferably horizontal. The bars 25 come parallel or substantially parallel to the axis and are preferably arranged in a balanced manner around the axis. For example, although twenty four bars are carried on the machine shown in the drawings, any number may be employed, and the arrangement is preferably such that the machine, when once it has its bars mounted in position, has sufficient raw material to give a continuous run for a required time, say at least ten hours without having to stop to replenish the bars.

The revolver type carrier 24 is arranged to be indexed one position at a time, in the usual manner of indexing turrets on turret or capstan lathes, the indexing mechanism being housed in the casing 26.

The indexing of the magazine is performed by a separate set of cams in the casing 26 mounted upon a shaft 103 independent of the main cam shaft and preferably running at a higher speed. By suitable positive clutches, these cams are arranged to rotate once only at the extreme end of the longitudinal movement of the magazine 24 when the bars 25 are clear of the headstocks and cutting tools. The usual locking catch or pawl is employed to locate the position of the magazine and engages for example in notches on the ring 104, but not necesarily to hold same against the very heavy vibrational action of the cutting tools for which a special clamping band 105 with spring means 106 (Fig. 2) is employed, the amount of clamping pressure being adjusted by means of locked nuts through the medium of a heavy spring. A cam releases this clamping pressure during the indexing movement and allows for reclamping immediately the locking bolt has entered into position. The indexing pawl is mounted upon a crank-pin having very little excess motion to the amount of travel required for indexing, thus giving the magazine its indexing movement without shock at either the commencement or the finish of the indexing motion.

Figure 1:
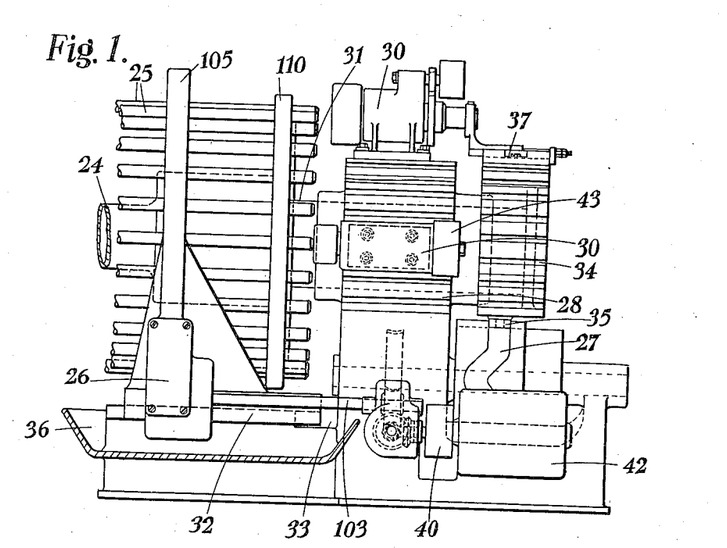
Fig. 1 is a side elevation of one form of machine tool constructed according to the invention, partly in section and with two tool headstocks in position.

The operation of the revolver type carrier is as follows:—The bars are fed (to the right Figs. 1 and 3) against the tools hereafter described at the required cutting speed by moving the carrier 24 by the usual cam formation such as 27, as used in automatic screw machines. They are then returned to their normal position and indexed, when the feeding forward is repeated.

Each of the bars 25 is preferably moved forward relatively to the others to bring a fresh portion into cutting position at a certain position in the cycle. This position preferably is the lowermost in the cycle and in this position the bar is uncramped, fed forward by cam or other means during or by the motion of the parts and recramped in the fed forward position.

Figure 3:
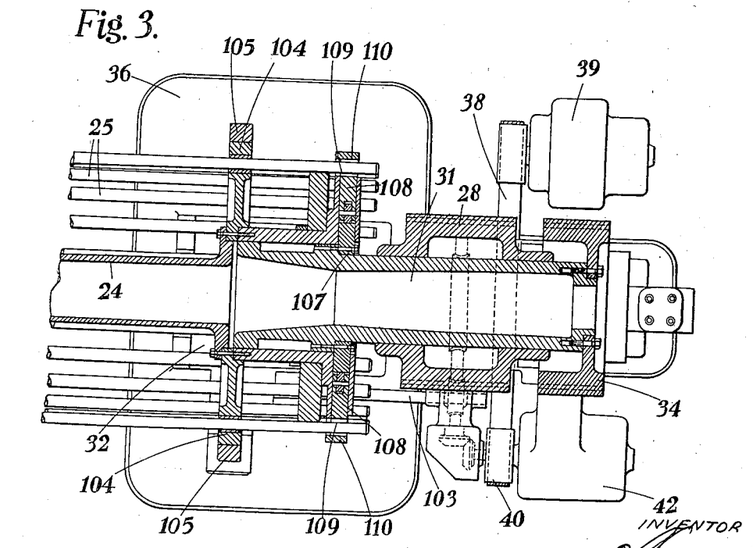
Fig. 3 is a sectional plan of Fig. 1 with parts omitted.
Figure 4:
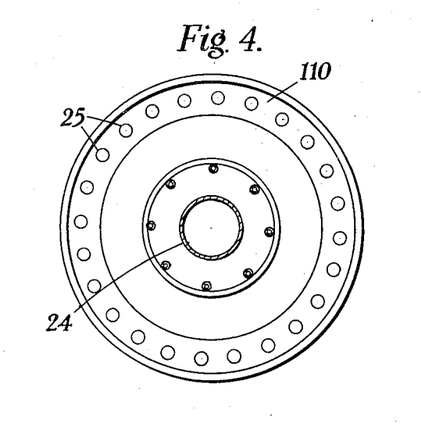
Fig. 4 is an end elevation of a detail of Fig. 1 comprising a portion of the carrier.

A simple mechanism for this purpose is indicated in Fig. 3 where 107 is a circular fixed cam bolted to the mandrel 31 (hereafter referred to). This cam normally keeps plungers 108 having teeth 109 pressed into gripping contact with the bars 25 passing through apertures in the rotary carrier plate 110 of the magazine.

On the underside the cam is relieved and the plunger in this position comes out of gripping contact with the bar 25 and allows it to be held in the forward position by a pawl or other one-way gripping device mounted on a fixed part of the machine. Thus when the magazine moves back it does not take this bar with it and consequently the bar relatively is fed forwards. On the indexing taking place the bar is gripped by its plungers 108 and the next following bar is released so as to be fed forward relatively to the others.

Any suitable stationary platform device may be utilized for supporting the cutting tools, such platform being correctly located with respect to the bar carrier. With a revolver type carrier such as hereinbefore described the stationary tool platform may be journalled or carry a bearing for the passage or support of a sleeve, shaft or other connection for the carrier.

In the constructional arrangement shown the platform is formed from a casting 28 having a substantially hollow cylindrical upper portion, the horizontal axis of which is coincident with the axis of the carrier. The outer, upper and side surfaces of this casting are machined or otherwise shaped into a number of flat surfaces or beds 29 each coming at the same radial distance from the centre so that the outline in cross section of this portion of the casting is that of a portion of a regular polygon. Nine such surfaces are shown in the drawings although more or less may be provided if required. Each bed may have one or more T slots (two being shown) extending from end to end and by this means each bed can have bolted thereto a fixed head or stock 30 carrying an associated tool or tools.

The tool supporting portion thus consists primarily of a centre body 28 with any desired number of facets, for instance nine, upon which facets can be fixed a variety of tool headstocks 30.

Through this centre body 28 passes a large sliding but non-rotatable mandrel 31 having a sliding fit in said body and arranged to be moved longitudinally as required.

At the left hand end of the mandrel 31 is mounted the magazine bar carrier 24 supporting, as before explained, as many bars as desired. In the particular machine there are 24 bars equally spaced in a circle, for example of 24" centre diameter, i. e., 15° apart. The magazine is carried and moved longitudinally by the centre mandrel 31 and further is supported by a secondary slide 32 on its under side and in co-operation with the base 33.

At the opposite or right hand end of the mandrel 31 is fixed a moving body 34 having corresponding sets of facets to the centre body 28, on the underside of which is mounted a stud and roller 35 acting against the cam formation 27 and the like from which the longitudinal motion is obtained. In addition the base 33 carries a chip pan 36 as well as the cam shaft, cam drums, slide 32 for magazine support and indexing mechanism 26 for the magazine.

Upon the centre stationary body 28 can be bolted a variety of headstocks for whatever operation is desired—a number of which will be hereafter described. The tool or tools within or upon these headstocks are given any required axial motion by the moving body 34 to which a projection such as indicated by 37 (Fig. 1) of the headstocks is connected and any required radial or partially radial motion by inclined slides (as hereafter explained) operated from the moving body with or without lost motion and stop devices. It will be seen that as the moving body 34 is connected permanently to the magazine 24 by the mandrel 31—the motion of same corresponds to the motion of the magazine. Further, the motion being imparted by the same cam 27, the cutting tools are operated to suit the movement of the bars of material carried by the said magazine.

The power to drive the machine and rotate the headstocks is through a common belt 38 from an electric motor 39 (or otherwise) this belt passing through the base of the machine to a pulley 40 driving the cams, and then on to the various headstocks 30, sufficient curvature and pulley contact being obtained by the use of idlers 41 as required.

The drive for the cams may be and preferably is taken through an infinitely variable ratio gear 42 of any suitable type, having a range of speed adjustment from zero upwards and if necessary a reverse, the desired speed variation being obtained from adjustable cams upon the main cam drum supplemented with a hand lever for the operator's use when setting and adjusting the machine. This mechanism is only indicated on the drawings as it is not novel per se and forms no essential part of the invention.

Owing to the variable ratio gear 42 having a standstill or zero position, no clutches are used in this control either to stop the cams or to give the usual fast and slow speed for idle or cutting times. To ensure a definite zero the hand control is operatively connected to the cam-shaft so that if this tends to move, notwithstanding the hand control being in the zero position, the hand control is displaced so as to maintain said cam-shaft in a substantially stationary position.

It is also desirable that the main drive of the machine should be through another variable ratio gear, for example mounted direct upon the electric motor 39. This gives great advantage for setting and adjusting the machine and cutting tools owing to the ability to rotate the cutting tool at a slow enough speed to cut dry temporarily (i. e. without oil or slurry) so that visual examination can be made. A further equally great advantage is being able to run the machine at the exact maximum cutting speed for whatever size of article is being made, and not an approximate speed as at present.

A pump (not shown) may be used to circulate the cutting fluid such as oil or the usual slurry compound. This pump is driven direct from the electric motor or other drive at a constant speed irrespective of whether the machine is operating or not, and independent of whatever speed the machine is being operated at.

The above, or any other suitable stationary centre body or platform may have any number of tool positions desired; that is to say, if a simple nut blank is being made, without the thread being tapped, only two tool positions are required, viz., drilling and machining the hexagon on one position, forming and parting off in the second position.

In the case of articles which require more than two tool positions, other tool heads can be bolted on without in any way re-arranging the machine. Thus, the machine may be a single spindle, two spindle, or any number of tool spindles within the limits of the machine, as the work requires.

From the above it will be appreciated and as before described, that all the cutting tools are rotated while the bar, or stock being machined is not rotated and it is therefore possible that each tool can be rotated at the correct number of revolutions to give the maximum cutting speed possible. Also, in the case of parting-off tools and the like, the speed of the cutting tool may be varied by suitable mechanism to increase its revolutions as it approaches the centre of the bar or stock (see below with reference to Figs. 19–23). By this feature, of having the correct cutting speed for each tool to suit its particular work, the output of the machine can be increased in some instances by more than 100% above the ordinary automatic screw machines at present in use, where owing to the fact that the bar or stock is rotated and the tools held stationary, the correct cutting speed can only be arranged for the slowest operation, that is for the largest diameter being machined.

The tool headstocks as before stated may have any desired forms and may in themselves constitute unitary structures. This facilitates their ready attachment in position or removal and allows one headstock to be removed and another of identical or other form, with the tools already set up, readily to be placed in position. In this manner, hold-ups due to broken tools can be reduced to a minimum of time.

Each headstock preferably comprises a solid or hollow tool spindle as the case may be and may also comprise a solid or hollow fixed spindle or otherwise by which it is connected to the movable body 34. Through the interaction of the movable body, the tool headstock has axial and radial motions imparted thereto, the latter being obtained by means of inclined surfaces, whilst the rotation of the tools is effected from a suitable pulley 43 in connection with the hollow or solid spindle referred to. Feeding motion of the headstock relatively to the bars being worked is obtained by holding it or part thereof stationary so that, in fact, the bars are fed to the tools during the forward longitudinal movement of carrier 24.

The driving pulleys 43 for the tool spindle are all interconnected by the single driving belt 38, and if desired idler pulleys 41 which come in suitable positions may be carried by brackets attached for example to the faces or beds, so that the driving belt engages with the tool pulleys 43 to a required angular extent.

Where parts have to be machined, by drilling or a similar operation and also by tools operating on the exterior, in some cases both operations may take place simultaneously in one tool position, although of course it will be understood that the two operations can be effected in separate tool positions.

An example of such a case is presented by the formation of a nut blank. For this purpose, in a primary tool position the bar must be centred to ensure its concentricity in subsequent tool positions. In another position the bar may be drilled, and in a further position given its exterior shape, but in a preferred arrangement the drilling and exterior shaping take place simultaneously in a single tool position.

Figure 2:
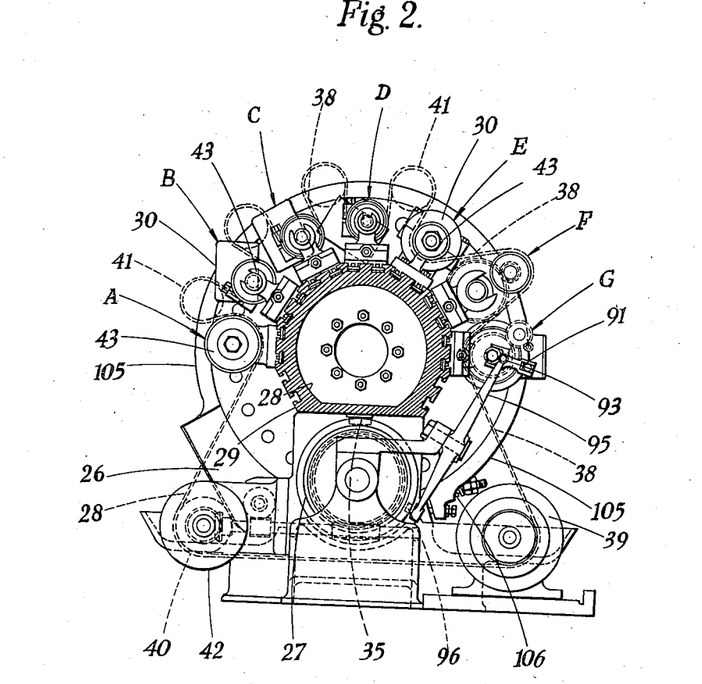
Fig. 2 is an end elevation of Fig. 1 partly in section and with seven tool headstocks in position.

In Fig. 2 of the drawings, seven tool headstocks are shown mounted in positions A to G and will hereafter be described for the manufacture of castellated nuts from hot rolled bar.

Figure 5:
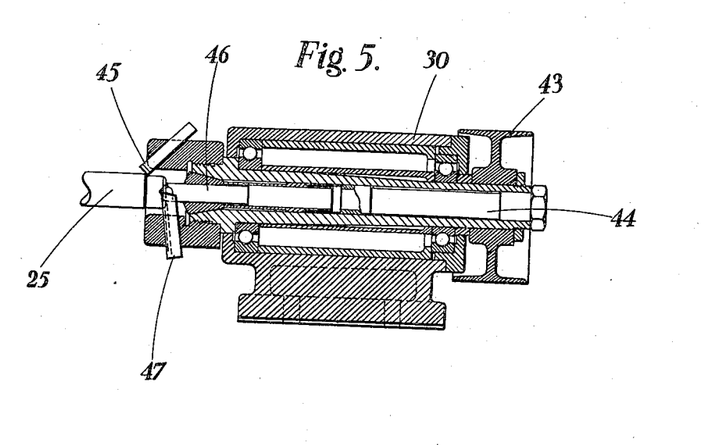
Figs. 5 and 6, 7 to 12, 13 to 15, 16 to 18, and 19 to 23 show various views more particularly hereinafter referred to, of five different forms of tool head-stocks for use in the machine.
Figure 6:
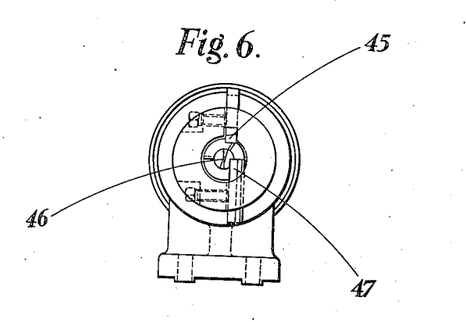
Figure 7:
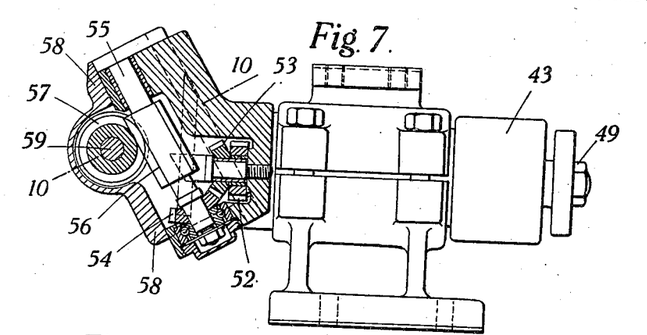
Figure 8:
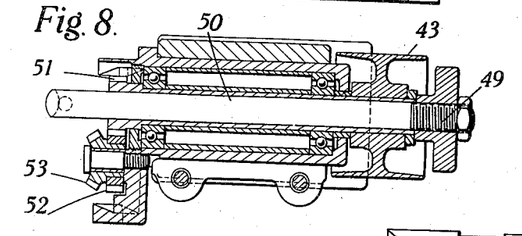
Figures 9, 10, 11, 12:
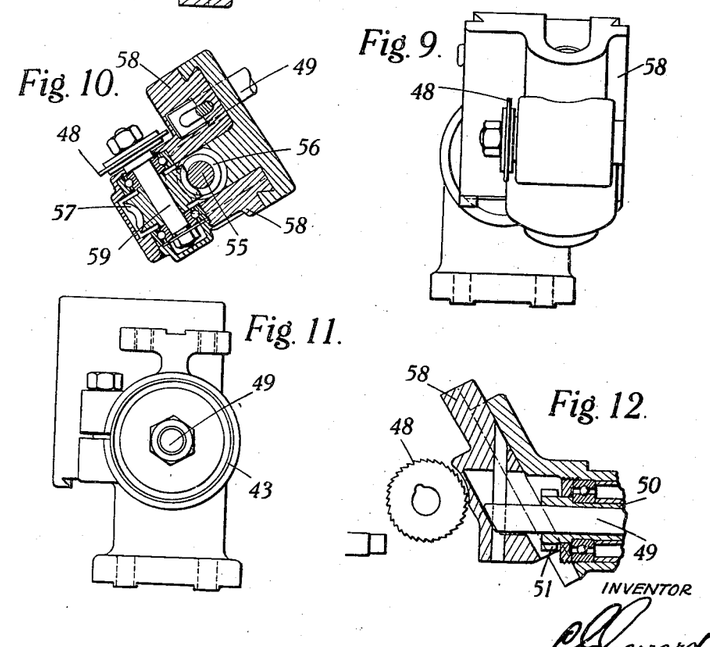

In position A (shown in detail in Figs. 5 and 6) centering, facing and skimming, are effected; in positions B, C and D (shown in detail in Figs. 7 to 12) castellating; in position E (shown in detail in Figs. 13 to 15) drilling and exterior formation of hexagon; in position F (shown in detail in Figs. 16 to 18) forming and recessing back end; and in position G (shown in detail in Figs. 19 to 23) parting-off, tapping and ejecting.

As the machine is for the case being considered using material in its cheapest form, i. e. "hot rolled bars", and as these bars are not perfectly straight, centering must be done after each indexing movement of the bars. Therefore, the first headstock position A (Fig. 2) and shown in longitudinal section and end elevation in Figs. 5 and 6 respectively is arranged to centre the bars as they are indexed; also to turn roughly the outside diameter, and face the front end, square. For this purpose the spindle 44 of the headstock carries a chuck having a skimming tool 45, a centering tool 46 acting partially as a countersinking drill, and a facing tool 47 for shaping the end of the bar.

For effecting the cross cuts, such for example as required in castellating nuts, a further headstock or headstocks may be provided and where such cross cuts are for castellating hexagon nuts, then they are used in triplicate, one for each saw cut and further they are made angularly adjustable. In the case under consideration these are mounted in positions B, C and D shown in Figs. 7 to 12.

The circular cutters 48 are mounted upon an angular slide and the traversing of said cutter across the end of the bar being cut is controlled by a non-rotating shaft 49 passing through the hollow rotary spindle 50 and suitably connected to the moving body 34, causing the cutter 48 to move longitudinally at the same speed as the magazine 24 and at the same time, owing to the angular slide, to have the desired traversing motion perpendicularly relatively to the end of the bar to make a straight cut across the centre of the nut blank.

In practice, it is desirable these castellating headstocks should be placed after the centering and facing headstock, but before the drilling and subsequent headstock, thus ensuring that there will be no burrs in the threads of the finished nuts.

The actual saw cutter 48 in the construction shown is driven through the rotating sleeve 50 from the headstock drive 43, the sleeve carrying a toothed pinion 51 meshing with an idler pinion 52 having a bevelled pinion 53 on the same spindle, this bevelled pinion meshing with a similar pinion 54 carried by the spindle 55 of a worm 56 mounted in the body of the headstock, the worm meshing with a worm wheel 57 in the inclined tool slide 58, the spindle 59 of the said worm wheel having the circular cutter 48 thereon. Any other arrangement, however, may be adopted. It will be appreciated that the three headstocks produce successive saw cuts in the blank to form the castellated parts thereof.

Figure 13:
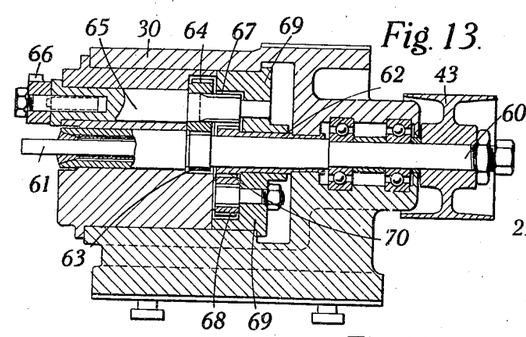
Figure 14:
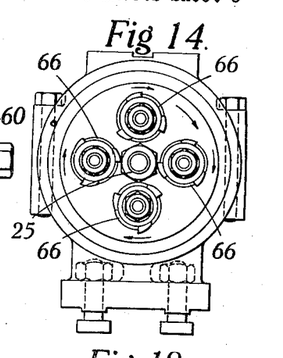
Figure 15:
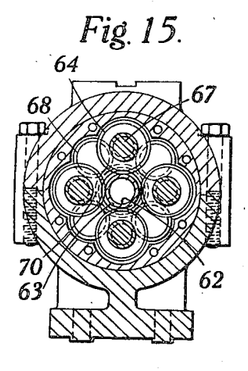

The next headstock, position E, Fig. 2, shown in sectional elevation, end section and end elevation respectively in Figs. 13, 14 and 15 respectively effects the drilling and exterior shaping simultaneously.

For this purpose in the position concerned the tool spindle 60 directly drives a drill 61 or other tool at the maximum possible cutting speed and around the tool spindle a secondary spindle 62 is arranged. This tool spindle is geared by a gear 63 in the manner of sun pinion to planet gears 64 on one or more spindles 65 arranged at a desired radial distance from the main spindle 60. These satellite or planetary spindles 65 carry cutters 66 which are rotated around the bar 25 by a planetary motion and about their own axes. The planetary motion is obtained by stepping the gears 64 at 67, meshing gears 67 with intermediate gears 68 (Fig. 15) the spindles of which are carried by the cage 69 and mounting the intermediate gears 68 to roll round a fixed gear 70 on the secondary spindle 62. The cutters are preferably relieved and project radially or substantially radially in equiangularly spaced positions from the axes of the planetary spindles 65, and are provided to a required number for giving the necessary polygonal shape to the exterior of the bar 25 simultaneously with the drilling thereof.

Any desired number of flats from two parallel flats to the formation of an octagon or other regular polygonal figure may be formed on the exterior of the bar according to the number of tools, the arrangement of the blades in the tools, and the relative diameter of the sun, planet and if required annulus or other gears for effecting the drive of the planetary spindles. For example each tool may have two or three blades or cutters projecting therefrom at equiangular positions, the tools being given the necessary planetary rotation around the bar, and also about their own axes, the number of rotations about their own axes in relation to the number of turns made around the bar varying according to the gearing. In this manner the paths of the actual cutting portions of the tools in relation to the bar, shape it with the necessary flats. It will of course be understood that the gearing for cutting at the correct cutting speed may be entirely independent of the speed of the twist drill or the like effecting the boring operation.

If it is desired to give a bright circular shape to the exterior of the bar, tools somewhat resembling milling cutters may be employed.

Should octagonal nuts be required, cutters with four cutting edges instead of three as shown, are used; when square nuts are required, two cutting edges are employed. Thus, irrespective of the formation of the bar, by merely changing the cutters in this headstock, nuts can be made square, hexagonal or octagonal, and the cutters and twist drill, being arranged upon the same centre, the operations take place simultaneously as the bar is fed against the cutting edges to the correct distance.

Another tool head especially for performing parting-off or similar operations or for performing a partial or initial stage thereof comprises a spindle which may be rotated from an associated pulley at constant speed or by suitable gearing, at a speed which can be varied as required, which is so arranged that the tools to effect their cutting move radially in relation to the bars or at a desired angle to the radial. Such a head may be situated on one of the beds of the platform in any desired and suitable position.

The actual parting-off or similar tool may be comprised by a single cutter operating on the exterior of the bar or by a plurality of cutters equiangularly spaced around the bar and arranged to move radially or at an angle to the radial, simultaneously.

In one arrangement, the tools are moved in a radial direction by being mounted upon inclined slides, set at an angle less than a right angle to the axis, for example at about 45° to the axis. Such slides work in conjunction with abutments in connection with the movable member, associated with the revolving bar carrier, in such a manner that when the bar is fed forward towards the tool head, these abutments cause the tool holder to move at right angles, or otherwise radially to, or substantially radially to the motion of the bar, thus feeding the tools regularly to perform cutting and parting-off operations.

Another headstock is provided for forming the bevelled edges or any other shape required, and at the same time recessing a countersunk groove at the back end of the inside of the nut to allow for tapping burrs and for the final parting-off to be accomplished without the necessity of any subsequent operation. This is the headstock coming in position F (Fig. 2) and shown in sectional elevation and two end elevations in Figs. 16, 17 and 18 respectively.

Figure 16:
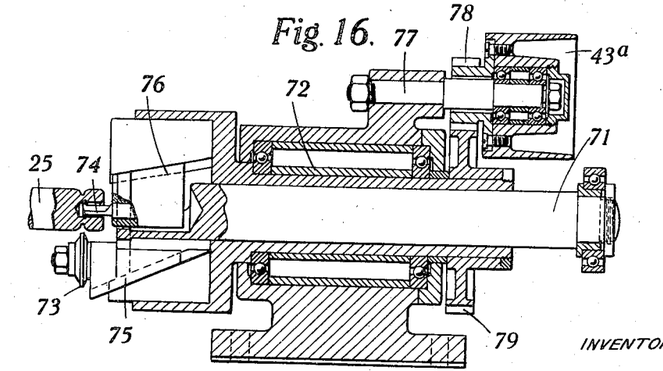
Figure 17:
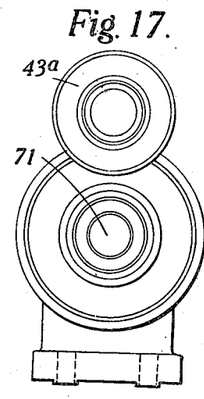
Figure 18:
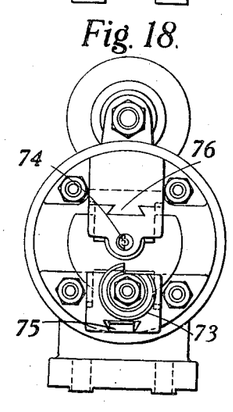
Figure 19:
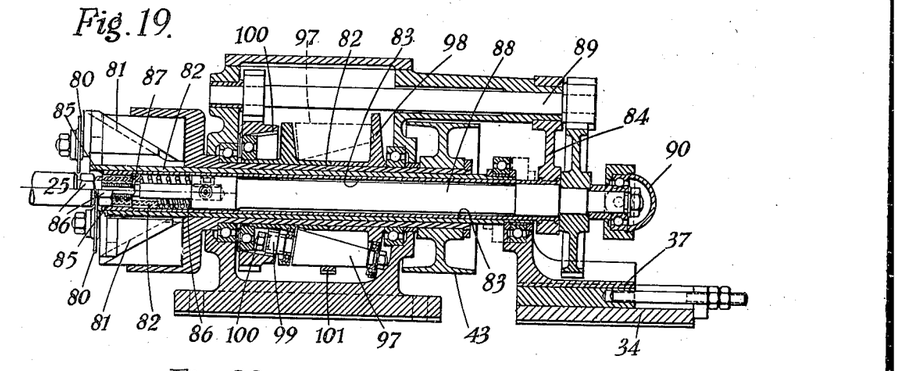
Figure 20:
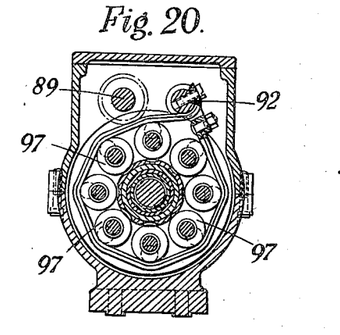
Figure 21:
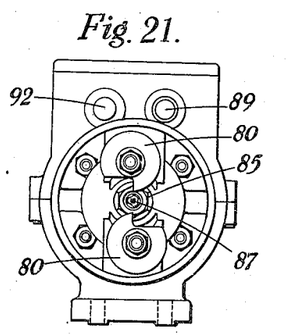
Figures 22, 23:
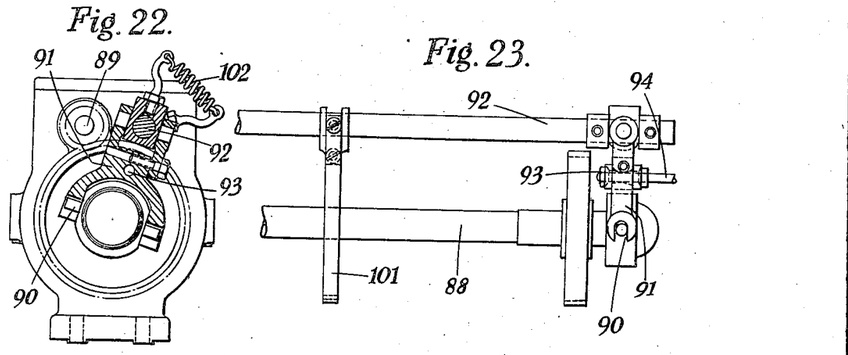

The motion of the two tools 73 and 74 is to move longitudinally at the same speed as the bar 25 is advanced, and each being arranged upon inclined slides 75 and 76 within the headstock to travel towards the centre the required distance—the latter distance being arranged by the angles of the said slides.

The motion is imparted and controlled by a freely rotatable shaft 71 passing through a hollow headstock spindle 72 and connected to a small slide fixed to the moving body 34 at the right hand of the machine—suitable adjusting means being provided upon this slide to regulate sizes etc. In this case the spindle 72 is driven from a pulley 43a the fixed spindle 77 of which has rotating thereon a pinion 78 meshing with a gear 79 fixed on the spindle 72.

A still further headstock is provided for the final parting-off of the nut from the remainder of the bar and tapping the thread. This is located in position G (Fig. 2) and shown in Figs. 19–23.

There are two parting off tools 80 which may be of circular form (they may be flat blades instead if desired) mounted on inclined slides 81, having their motion controlled in the same way as previously described headstocks by a rotary hollow axle 82 passing through the headstock and connected to the moving body 34. The upper tool 80 in Fig. 19 and the sleeve 82 are shown at the commencement of the cut and the lower tool 80 and sleeve 82 in the same figure towards the end of the cut. The connection 37 (for the movable body 34) is also shown in this last-mentioned position.

Inside this hollow axle 82 is another tube 83 held stationary by the arm 84—both as regards longitudinal motion relatively to the headstock and rotating motion. The forward end 85 of the tube 83 is of hexagonal internal form in order to fit the nut 86 in free manner so that the nut 86 which is being parted off the bar 25 enters the hexagon formation 85 as the bar 25 is advanced and compresses a spring loaded ejector 86. Inside this stationary inner tubular axle 83 is the tap 87 and tapping spindle 88. The setting of the tap is exactly flush with the end of the hollow hexagon 85 in which position it should be stationary, i. e. not rotating. The tapping spindle 88 at the opposite end is geared to a second motion shaft 89 which second motion shaft is in turn geared to the main spindle of the headstock through a reversing and adjustable speed gear as hereafter described. Behind the first mentioned gear on the tapping spindle is mounted a trunnion type of bearing 90, a lever 91 (also in Fig. 2) from which is jointed to the control rod 92 of the reversing gear at its outer extremity and in between at 93 through an adjustable link 94 to a lever 95 operated by the main cam drum 96, thus forming a hunting motion connection, the purpose of which is to regulate and control reversing and speed of rotation of the tap 87 in either direction and operates as follows:

Upon the magazine 24 advancing, the nut to be parted off enters the hollow hexagon tube 85 and pushes the tap 87 backwards slowly. The hunting motion described above by the movement thus given to the tapping spindle 88 causes the control rod 92 of the variable speed gear to move and the tap is slowly turned at a speed automatically correct to the thread pitch of the tap, causing same to enter into the nut as it is being parted off so that by the time the parting off tools have separated the nut from the bar, the nut is tapped substantially half way through. In the meantime the spring loaded ejector 86 keeps the parted off nut against the tools until the back face is properly trimmed, the hollow hexagon tube 85 preventing rotation of the nut and no burr is left. At this stage while the parting tools are finishing trimming up the end of the bar the main cam 96 causes the hunting lever 95 to move the speed control rod 92 further forward and the tap gains speed, drawing the nut away from the parting tools up to the required distance along the tap to complete the tapping. Timed to correspond, the magazine 24 will now commence to retire ready for indexing. At the same moment the cam 96 causes the hunting lever 95 to reverse the tap's rotation screwing the now finished nut off the tap, which nut immediately it is free of the tap is shot by the spring ejector 86 out of the hollow hexagon tube 85 into a collector (not shown) which is positioned to catch the finished nuts and thereby keep them separate from the steel chips etc.

Any suitable form of variable gear may be controlled from the tapping headstock to effect the necessary tapping action as described, but the preferred form comprises, as shown in Figs. 19 to 23, conical satellite members 97 carried by a rotatable cage 98 the spindles of the said conical satellites carrying pinions 99 at their larger ends having a pitch diameter equal to, or substantially equal to, the diameter of an intermediate section of the conical satellite members. These pinions 99, gear with an annulus 100, also toothed on the exterior and gearing through the lay shaft 89 and gear wheels with the spindle 88 carrying the tap 87. The rotary movement is imparted from the drive 43 and 82 of the headstock to the cage 98 carrying the conical satellite members 97.

The conical satellite members are arranged so that their axes are inclined in such a manner as to bring their outermost surfaces parallel with the axis of rotation of the cage. To cause the satellites to rotate on their axes they roll in a flexible belt-like member 101, the ends of which are suitably anchored to the rod 92 and preferably spring controlled at 102 to maintain a driving grip on the surfaces of the conical satellite members 97. By moving this fixed belt member 101 axially through a suitable striking gear, by hand or automatically as hereinbefore described, through the movements of the rod 92, it contacts with various sections of differing diameters of the conical satellite members 97 and in this manner effects the variable drive. Owing to the fact that the pitch diameter of the pinions 99 of the conical satellite members is that of an intermediate section of the said conical satellite members, when the engaging belt 101 is in the said intermediate position, no drive of the tap takes place, this being the neutral position. At either side of the neutral position, however, the drive is effected, the rate depending upon the distance from the neutral position.

It will readily be understood that various other forms of headstocks may be used according to the machining operation, such for example as for cross drilling, square nuts, octagonal nuts or otherwise, without impairing or reducing the output of the machine.

As each tool has a self-contained headstock, all tools can be run at their best cutting speeds for maximum output and long life of the cutting edges. Moreover, as the headstocks are readily mounted and dismounted in position, spares, with tools already set up, may be included in the equipment to minimize any hold-up due to breakages.

The invention is not limited to the precise forms or details of construction described, as these may be varied to suit particular cases.

What I claim and desire to secure by Letters Patent of the United States of America is:—

1. Machine tools for producing repetition articles from bars of stock comprising a carrier adapted to support said bars in a non-rotary manner, means to grip said bars to said carrier, means for applying rotary indexing movements to said carrier, a plurality of rotary tool means, means for applying longitudinal reciprocatory movement to said carrier to feed the bar ends relatively to some of said tool means to perform cutting or forming operations thereon, means to reciprocate other of said tool means in unison with the carrier whereby operations in the radial direction may be performed on the bar end, and means for rotating all said tool means.

2. Machine tools for producing repetition articles from bars of stock comprising a rotary carrier adapted to support the bars, a plurality of rotary tool devices adapted to operate on the ends of said bars to form articles thereon and to part said articles therefrom, means to grip said bars in said carrier, said means being adapted to release one of said bars, means to displace said carrier longitudinally to feed the ends of the bars relatively to some of said tool devices to perform progressive cutting operations on the ends of said bars by the action of said rotary tools means, means to hold the bar released from the carrier during retrogressive movement thereof to permit said bar to be moved forward relatively to the others, means for reciprocating other of said tool devices in unison with the carrier to perform radially directed operations on the bar ends, and means for rotating all of said tool devices simultaneously.

3. Machine tools for producing repetition articles from bars of stock comprising a carrier for a plurality of bars of stock adapted to carry said bars around the circumference of a circle, means associated with said carrier to grip said bars of stock therein, a support for a plurality of rotary headstocks which have their operative ends in axial alignment with the ends of the bars in the carrier, means to reciprocate said carrier in the longitudinal direction towards and away from said headstocks support, a member movable in unison with the carrier, means slidably to support some of said headstocks on said support, said headstocks being connected to said slidable support, whereby the operative parts of said headstocks move in unison with the bar ends to perform radially directed operations thereon, and means for rotating all of said headstocks.

4. Machine tools for producing repetition articles from bars of stock comprising a stationary base, a support for a plurality of rotary headstocks the operative portions of which are disposed around a circular path, a carrier for a plurality of bars of stock, also disposed around a similar circular path, means for gripping said bars to said carrier, means for longitudinally reciprocating said carrier to feed the bars towards and away from the headstock means located on said support means to reciprocate some of said headstocks on said support, means to release one of said bars in said carrier, means to grip said released bar during retrogressive movement of the carrier to permit said released bar to be fed forward relatively to the others, and means for applying successive rotary indexing movements to said carrier to apply the bars successively to said rotary headstock devices.

5. Machine tools for producing repetition articles from bars of stock comprising a carrier adapted to support a plurality of bars of stock, means for longitudinally reciprocating said carrier, a plurality of rotary tool means arranged in circumferential alignment with some of said bars of stock, there being a smaller number of tool means than of bars, means for gripping said bars in said carrier, means to apply successive rotary indexing movements to said carrier to present said bars successively to said tool means, means to reciprocate some of the said tool means in unison with the longitudinal reciprocatory movement of the carrier whereby operations in the radial direction may be performed on the bar end, and means for rotating all said tool means.

6. Machine tools for producing repetition articles from bars of stock comprising a carrier adapted fixedly to support a plurality of bars of stock, means for longitudinally reciprocating said carrier, tool means for operating on said bars, said tool means including cutters disposed parallel to and out of alignment with the bar axis, means for driving said tool means, means for applying successive rotary indexing movements to said carrier to present said bars successively towards said tool means and means to reciprocate some of the said tool means in unison with the longitudinal reciprocatory movement of the carrier whereby operations in the radial direction may be performed on the bar end.

7. Machine tools for producing repetition articles from bars of stock comprising a carrier adapted to support a plurality of bars of stock, means for gripping said bars to said carrier, rotary tool means adapted to operate on the ends of some of said bars, the different bars being operated upon successively, said rotary tool means including a headstock, rotary cutters mounted in said headstock, means for applying cycloidal movements to said cutters to produce flats on the bar under treatment, means for applying feeding movement to said bar relatively to said cutters, and means for applying rotary indexing movement to said carrier to present the different bars successively to said cutters.

8. Machine tools for producing repetition articles from bars of stock comprising a carrier for a plurality of bars of stock, means for gripping said bars to said carrier, means for feeding said bars successively in said carrier, a plurality of headstocks adapted to operate successively on said bars to form articles thereon and to part said articles therefrom, means for driving said headstocks in unison, said latter means including a unitary belt traversing driving pulleys associated with each headstock, power means for driving said unitary belt, and means for applying successive rotary indexing movements to the carrier to present the different bars successively to the headstocks.

9. Machine tools for producing repetition articles from bars of stock comprising a carrier for a plurality of bars of stock, means for gripping said bars in said carrier, means for feeding one bar forward relatively to the others at a selected point of said carrier whereby all of said bars are successively fed forward, a plurality of rotary headstocks adapted to operate on the ends of said bars to form articles thereon and to part said articles therefrom, driving pulleys on said headstocks, said driving pulleys being of different sizes to permit said headstocks to be driven at speeds suitable for the operations performed by said headstocks, a unitary belt co-operating with all of said pulleys, power means for driving said unitary belt, and means for applying successive rotary indexing movements to said carrier to present the bars successively to the headstocks.

10. Machine tools for producing repetition articles from bars of stock as claimed in claim 1 including means for automatically varying the cutting speed during the cutting operation of a tool means.

11. Machine tools for producing repetition articles from bars of stock as claimed in claim 1 wherein some of the tool means are comprised by slitting saws and including means to traverse said slitting saws radially across the ends of the bars of stock to form a plurality of transverse slits therein and means for applying successive rotary indexing movements to the carrier of the said bars to present the ends of the said bars successively to the different slitting saws.

CHARLES GEORGE GARRARD.